United States Patent [19]
Horvath et al.

[11] Patent Number: 5,119,565
[45] Date of Patent: Jun. 9, 1992

[54] CORNER LEVEL APPARATUS

[76] Inventors: James Horvath; Richard L. Horvath, P.O. Box 159, Wawarsing, N.Y. 12489

[21] Appl. No.: 770,441

[22] Filed: Oct. 3, 1991

[51] Int. Cl.$^5$ .......................... G01C 9/28; B44D 3/38
[52] U.S. Cl. ........................................ 33/405; 33/414; 33/451
[58] Field of Search ................ 33/414, 405, 413, 451, 33/756, 382, 381, 370, 371, 372, 373

[56] References Cited

U.S. PATENT DOCUMENTS

| | | | |
|---|---|---|---|
| 625,019 | 5/1899 | Cardell | 33/382 |
| 1,020,020 | 3/1912 | Brawley | 33/371 X |
| 2,689,412 | 9/1954 | Young | 33/382 X |
| 3,524,259 | 8/1970 | Handley | 33/382 X |
| 3,826,013 | 7/1974 | Baher | 33/373 X |

Primary Examiner—Harry N. Haroian
Attorney, Agent, or Firm—Leon Gilden

[57] ABSTRACT

A corner level apparatus arranged for alignment of structural components at a corner intersection includes intersecting first and second arms, wherein the arms define an acute included angle therebetween, generally at forty-five degrees. A mount projects rearwardly of the junction for securement of a spirit level arranged parallel to a top surface of the first and second arms. A modification of the invention includes support legs telescopingly and adjustably mounted relative to a bottom surface of the arms projecting downwardly therefrom for support of the level structure for use as a gauge and a securement of various structural components at the corner intersection of a dwelling, wherein the apparatus in a further refinement includes chalk lines retractably mounted within each of the arms for alignment of the arms and use of the chalk line as a gauge in structural construction.

6 Claims, 4 Drawing Sheets

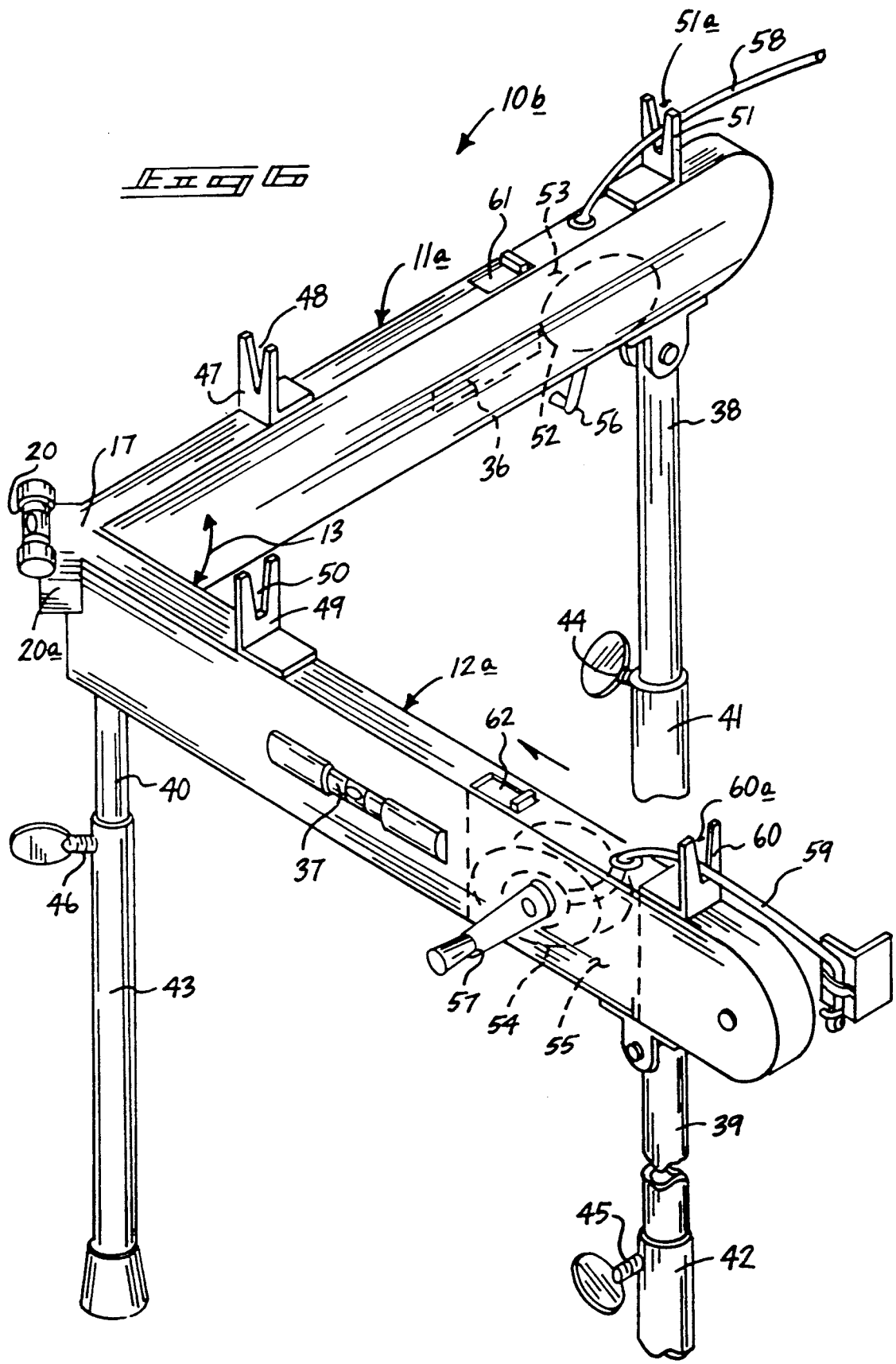

CORNER LEVEL APPARATUS

BACKGROUND OF THE INVENTION

1. Field of the Invention

The field of invention relates to gauge apparatus, and more particularly pertains to a new and improved corner level apparatus wherein the same is arranged for the alignment and gauging in a construction environment.

2. Description of the Prior Art

Various gauges of specialized types are utilized in the prior art in the alignment and orientation of structural components in a construction environment. Such apparatus is exemplified in U.S. Pat. No. 4,168,578 to Vanderwerf illustrating a four-way corner level, wherein spaced plates are arranged coextensively relative to one another mounting a spirit level to each side wall of the plates.

U.S. Pat. No. 4,955,141 to Welch sets forth an adjustable pivot angle square, wherein a first leg is pivotally mounted relative to a second leg, wherein a link including a roller is slidably mounted within an enclosed slot of the second leg.

U.S. Pat. No. 4,813,149 to Herkimer sets forth a level wherein a first plate includes second and third plates pivotally mounted at each distal end of the first plate.

As such, it may be appreciated that there continues to be a need for a new and improved corner level apparatus as set forth by the instant invention which addresses both the problems of ease of use as well as effectiveness in construction and in this respect, the present invention substantially fulfills this need.

SUMMARY OF THE INVENTION

In view of the foregoing disadvantages inherent in the known types of level apparatus now present in the prior art, the present invention provides a corner level apparatus wherein the same includes a plurality of arms intersecting at an acute angle, wherein a top surface of the arms are in coplanar relationship relative to one another, with a spirit level mounted in a parallel relationship relative to the coplanar top surfaces. As such, the general purpose of the present invention, which will be described subsequently in greater detail, is to provide a new and improved corner level apparatus which has all the advantages of the prior art level apparatus and none of the disadvantages.

To attain this, the present invention provides a corner level apparatus arranged for alignment of structural components at a corner intersection including intersecting first and second arms, wherein the arms define an acute included angle therebetween, generally at forty-five degrees. A mount projects rearwardly of the junction for securement of a spirit level arranged parallel to a top surface of the first and second arms. A modification of the invention includes support legs telescopingly and adjustably mounted relative to a bottom surface of the arms projecting downwardly therefrom for support of the level structure for use as a gauge and a securement of various structural components at the corner intersection of a dwelling, wherein the apparatus in a further refinement includes chalk lines retractably mounted within each of the arms for alignment of the arms and use of the chalk line as a gauge in structural construction.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved corner level apparatus which has all the advantages of the prior art level apparatus and none of the disadvantages.

It is another object of the present invention to provide a new and improved corner level apparatus which may be easily and efficiently manufactured and marketed.

It is a further object of the present invention to provide a new and improved corner level apparatus which is of a durable and reliable construction.

An even further object of the present invention is to provide a new and improved corner level apparatus which is susceptible of a low cost of manufacture with regard to both materials and labor, and which accordingly is then susceptible of low prices of sale to the consuming public, thereby making such corner level apparatus economically available to the buying public.

Still yet another object of the present invention is to provide a new and improved corner level apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 6 is an isometric illustration of a further modification of the invention.

DESCRIPTION OF THE PREFERRED EMBODIMENT

Figure 1:
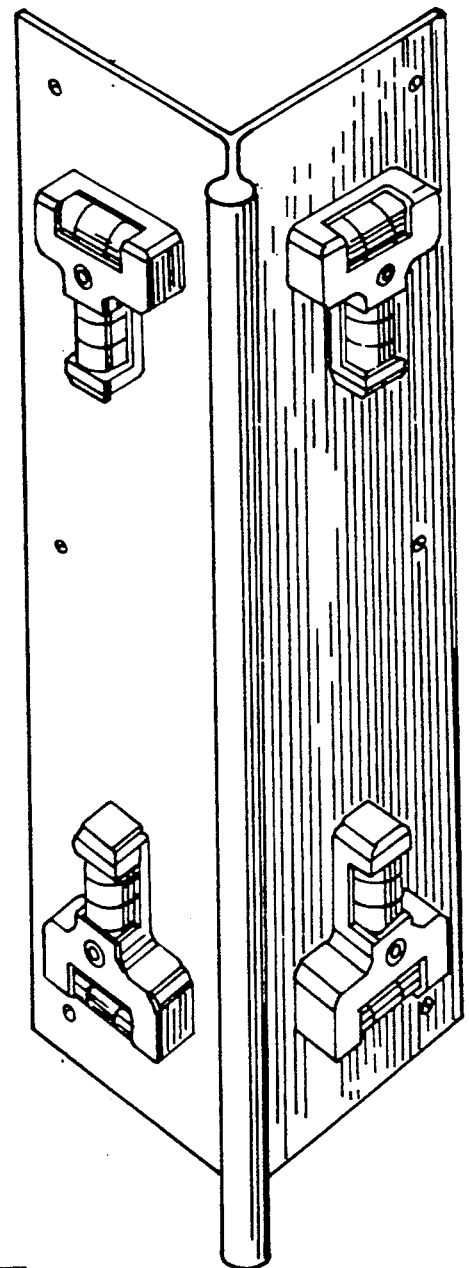
FIG. 1 is an isometric illustration of a prior art level structure.

With reference now to the drawings, and in particular to FIGS. 1 to 6 thereof, a new and improved corner level apparatus embodying the principles and concepts of the present invention and generally designated by the reference numerals 10, 10a, and 10b will be described.

Figure 2:
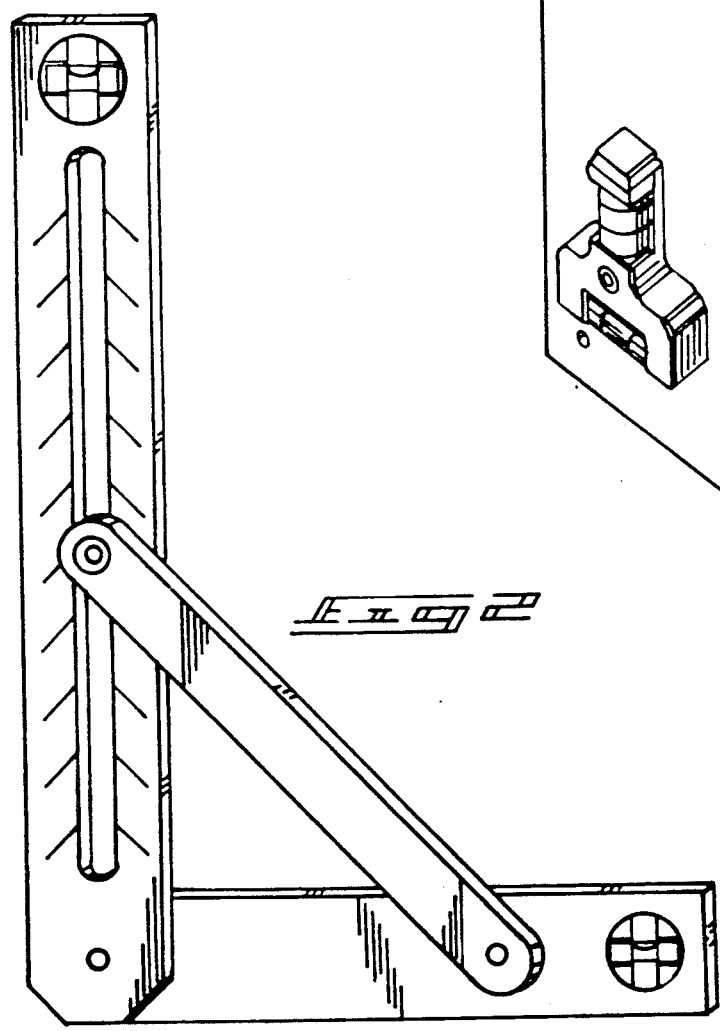
FIG. 2 is an isometric illustration of a further example of a prior art level apparatus.
Figure 3:
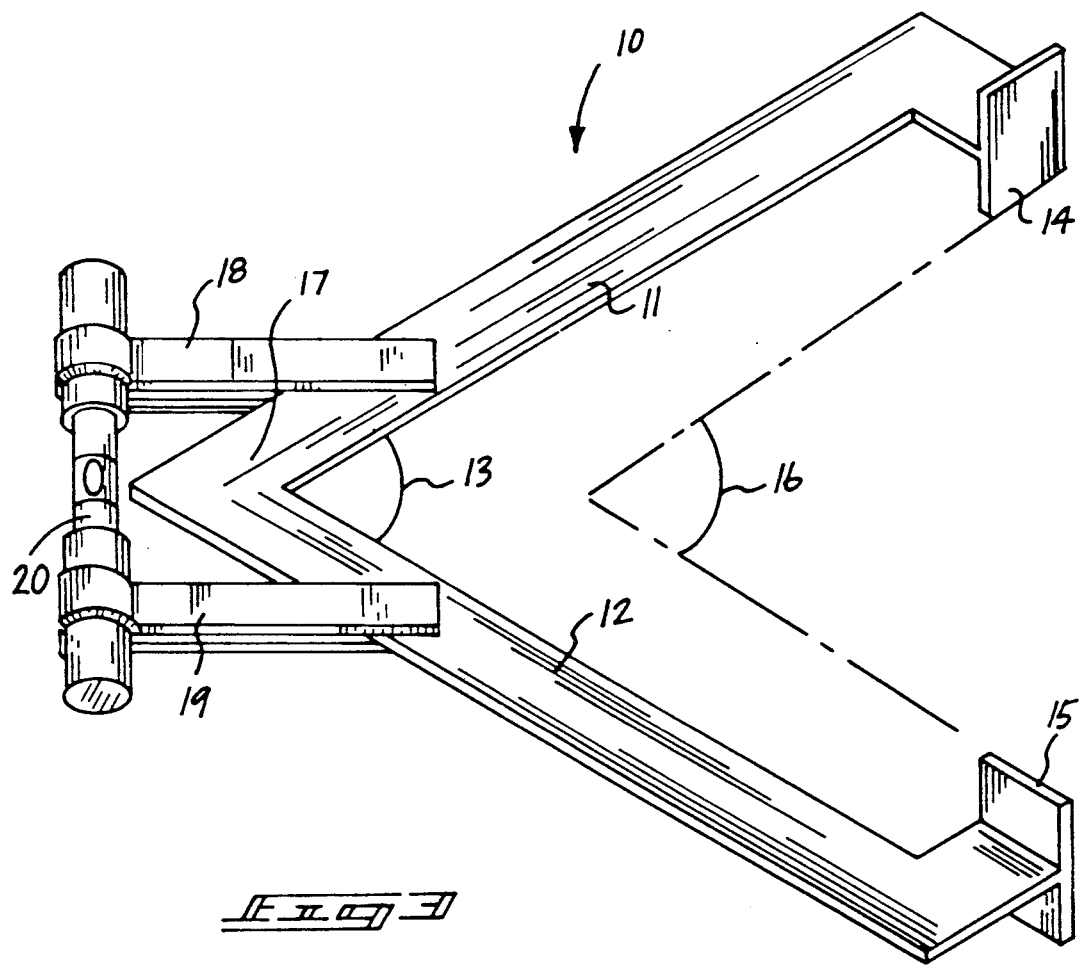
FIG. 3 is an isometric illustration of the instant invention.
Figure 4:
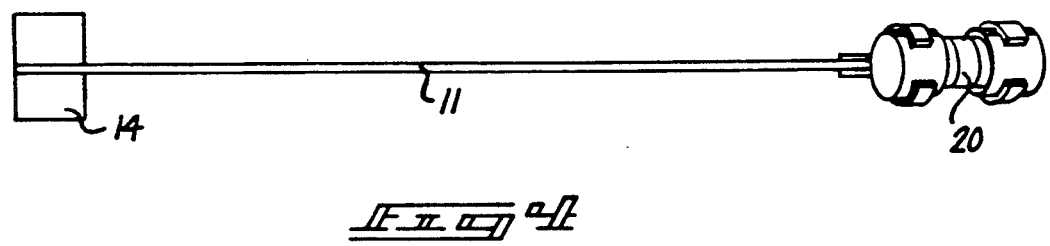
FIG. 4 is an orthographic side view of the instant invention.

FIG. 1 illustrates a prior art corner level apparatus, as exemplified in U.S. Pat. No. 4,168,578, wherein a plurality of plates are arranged coextensively relative to one another, wherein an outer surface of each plate includes a plurality of spirit level members mounted thereon. The prior art FIG. 2 illustrates a further example of a level or square structure, as set forth in U.S. Pat. No. 4,955,141, including a plurality of pivotally mounted arms, wherein each arm includes a spirit level mounted within each arm at an outer distal end thereof.

More specifically, the corner level apparatus 10 of the instant invention essentially comprises a first arm 11 fixedly mounted relative to a second arm 12 to define an acute angle therebetween and typically of forty-five degrees. Each of the first and second arms 11 and 12 includes a top planar surface arranged in a coplanar relationship. A first arm plate 14 is illustrated orthogonally mounted to a side of the first arm, wherein a second arm plate 15 orthogonally mounts a side of the second arm defining a second included angle defined interiorly between the first and second arms also of an acute angle and of ninety degrees when the first angle is forty-five degrees. The junction 17 defining an intersection of the first and second arms includes at least a first mount and as illustrated, a second mount 18 and 19 respectively projecting rearwardly of the junction and the first and second arms to secure a spirit level is 20 rearwardly of the junction 17, wherein the spirit level is arranged parallel relative to the coplanar top surfaces of the first and second arms 11 and 12.

Figure 5:
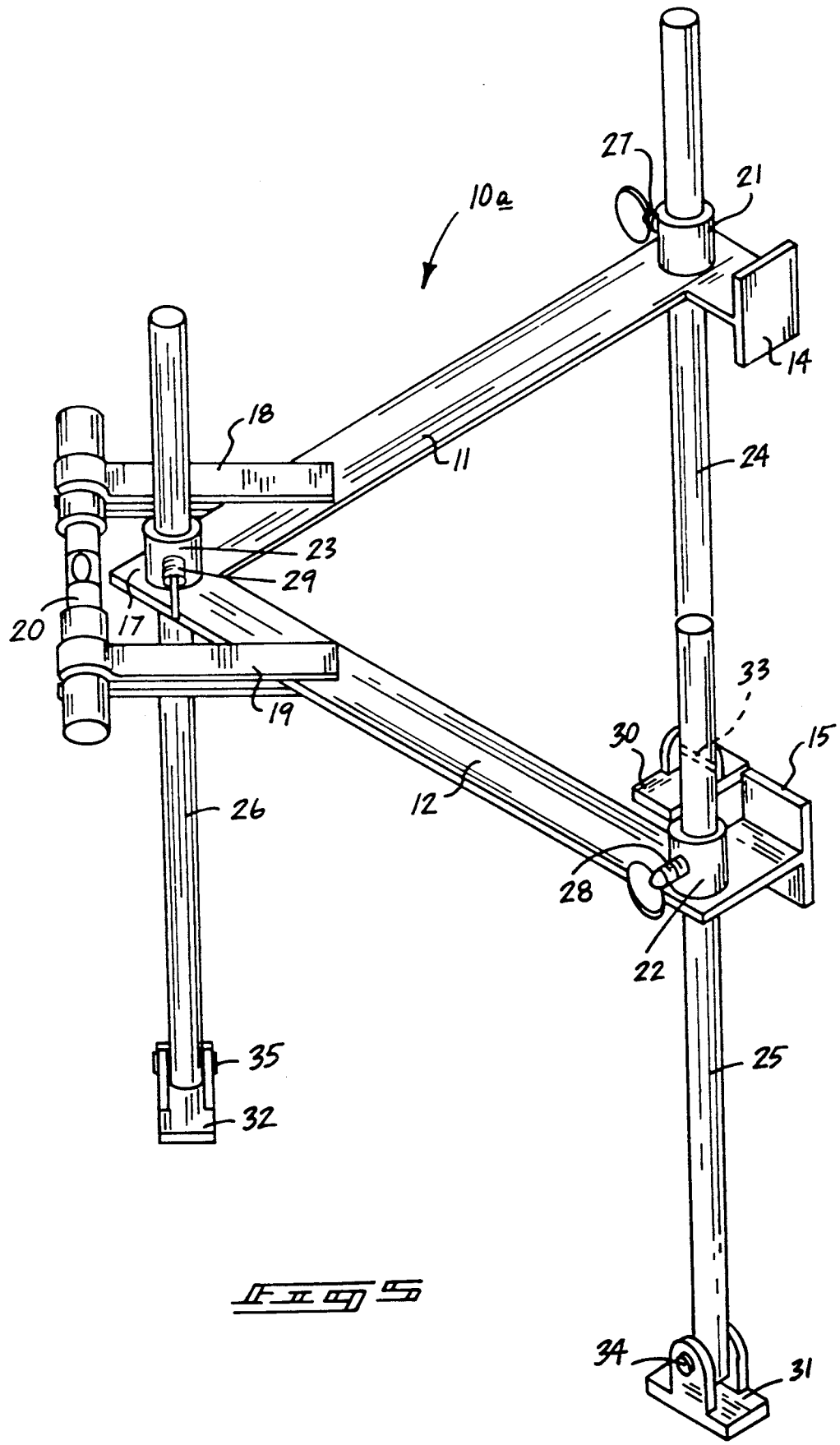
FIG. 5 is an isometric illustration of a modification of the invention.

The modified apparatus 10a, as illustrated in FIG. 5, includes a respective first, second, and third tubular sleeve mount 21, 22, and 23, each arranged parallel relative to one another positioned at an outer distal end of the first and second arms and at the junction 17 respectively. The first, second, and third tubular sleeve mounts include a respective first, second, and third support rod slidably received therethrough, wherein each of the rods are arranged parallel relative to each other and include a respective first, second, and third foot plate 30, 31, and 32 pivotally mounted at each lower distal end of each rod about a respective first, second, and third pivot pin 33, 34, and 35 respectively. A respective first, second, and third lock rod 27, 28, and 29 is radially arranged to project into each of the respective first, second, and third tubular sleeve mounts to effect selective vertical locking of the rods, as illustrated, to permit positioning of the organization 10a to an underlying support surface in a gauging procedure.

The further modified apparatus 10b, as illustrated in the FIG. 6, includes a respective first, second, and third support leg 38, 39, and 40 mounted to a forward distal end bottom surface of each of the respective first and second modified arms 11a and 12a defining respective first and second arm housings 11a and 12a, with the third support leg 40 mounted at the intersection 17, wherein each of the support legs 38, 39, and 40 are preferably arranged parallel relative to one another, but if required, may be pivotally mounted at their upper terminal ends as illustrated. A first and second spirit level 36 and 37 is mounted to each outer wall of each respective first and second arm housing 11a and 12a in cooperation with the spirit level 20 utilizing a spirit level mount 28 to project the spirit level 20 rearwardly of the junction 17, but arranged parallel relative to top surfaces of the first and second arm housings 11a and 12a. The support legs 38-40 utilize respective first, second, and third sleeves 41, 42, and 43 slidably and complementarily receiving each respective first, second, and third support leg utilizing respective first, second, and third sleeve lock rods 44, 45, and 46 threadedly and radially directed into each of the respective first, second, and third sleeves for abutment with a respective support leg to telescopingly adjust a respective sleeve relative to a support leg for permitting positioning of each respective support leg relative to an underlying support surface.

The first arm housing 11a includes a first arm rear viewing plate 47 spaced from and parallel a first arm forward viewing plate 51. These first and second arm viewing plates include respective rear and forward first arm "V" notches 48 and 51a respectively arranged to provide for alignment of a first marker chalk line 58 retractably and slidably mounted from within the first arm housing. The second arm housing 12a includes a second rear and forward viewing plate 49 and 60 arranged in a parallel spaced relationship, including second rear and forward "V" shaped notches 50 and 60a to provide for visual gauging and aligment of a second marker chalk line 59 retractably mounted within the second arm housing 12a. The first marker chalk line 58 is wound about a first reel 52 rotatably mounted within a first housing cavity 53 that is typically filled with a chalk dust for chalking of the first marker chalk line 58. A second reel 54 rotatably mounted within a second housing cavity 55 within the second arm housing 12a, also filled with chalk dust, permits winding and reeling of the second marker chalk line 59 through the top surface of the second arm housing. Respective first and second crank arms 56 and 57 effect reflective winding and reeling of the first and second reels 52 and 54 respectively. It is further noted that the first housing cavity 53 and the second housing cavity 55 each include a respective first and second access door 61 and 62 directed through the top surface of the respective first and second arm housings 11a and 12a to permit refilling of the first and second housing cavities 53 and 55 as required with commercially available chalk dust utilized in the coating of chalk lines.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A corner level apparatus, comprising, a first arm member fixedly and orthogonally mounted to a second arm member at a junction, the first arm member including a first top surface and the second arm member including a second top surface, wherein the first top surface and the second top surface are arranged coplanar to one another, and a mount secured to the junction extending exteriorly of the first arm member and the second arm member, wherein the mount fixedly secures a spirit level, the spirit level arrange parallel relative to the first top planar surface and the second top planar surface, and the first arm member includes a forward distal end and the second arm member includes a further forward distal end, and a first support leg mounted to the forward distal end and a second support leg mounted to the further forward distal end extending downwardly relative to the respective first and second arm member, and a third support leg mounted to the junction extending downwardly therefrom, the first support leg including a first sleeve fixedly secured to the first arm member and slidably and complementarily receiving the first support leg therethrough said second support leg including a second sleeve fixedly secured to the second arm member and slidably and complementarily receiving the second support leg therethrough and a third sleeve fixedly secured to the junction and slidably and complementarily receiving the third leg therethrough, and the first sleeve including a first lock member, the second sleeve including a second lock member, and the third sleeve including a third lock member for respective securement of the first, second, and third support legs relative to the respective first, second, and third sleeves.

2. An apparatus as set forth in claim 1, wherein the first arm member top surface includes a first arm rear viewing plate spaced from and parallel a first arm forward viewing plate, the first arm rear viewing plate and the first arm forward viewing plate including respective first arm rear "V" notch and a first arm forward "V" notch, and the second arm member top surface including a second arm rear viewing plate and a second arm forward viewing plate arranged in a spaced parallel relationship relative to one another, wherein the second arm rear viewing plate includes a second arm rear "V" notch and the second arm forward viewing plate includes a second arm forward "V" notch, the first arm member including a first arm member cavity, and the second arm member including a second arm member cavity, the first arm member cavity including a first member chalk line retractably mounted within the first arm cavity and directed through the first arm member top surface between the first arm rear viewing plate and the first arm forward viewing plate arranged for sliding projection through the first arm forward viewing plate "V" notch, and the second arm member including a second housing cavity positioned below the second arm member top surface and including a second member chalk line retractably mounted within the second housing cavity directed through the second arm member top surface between the second arm member rear viewing plate and the second arm member forward viewing plate and slidably directed through the second arm member forward "V" notch.

3. An apparatus as set forth in claim 2 wherein the first housing cavity and the second housing cavity each contain a predetermined quantity of chalk dust therewithin in communication with the respective first and second chalk line.

4. An apparatus as set forth in claim 3 wherein the first arm member top surface includes a first access door directed through the first arm member top surface in communication with the first housing cavity, and the second arm member top surface includes a second access door directed therethrough in communication with the second housing cavity.

5. An apparatus as set forth in claim 4 wherein the first housing cavity includes a first reel member, the first reel member including a first crank arm secured to the first reel member, wherein the first crank arm is coaxially mounted to the first reel member and the first reel member is rotatably mounted within the first housing cavity, and the first reel member includes the first chalk line wound thereabout, and the second housing cavity includes a second reel member rotatably mounted within the second housing cavity, and the second reel member including a second crank arm coaxially and fixedly mounted to the second reel member and the second crank arm positioned exteriorly of the second arm member to effect selective rotation of the second reel within the second housing cavity, with the second chalk line secured to the second reel for selective winding and reeling of the second chalk line about the second reel.

6. An apparatus as set forth in claim 5 wherein the first arm includes a first arm spirit level longitudinally aligned and fixedly secured to the first arm member orthogonally oriented relative to the spirit level and fixedly secured rearwardly of the junction, and the second arm member includes a second arm spirit level longitudinally aligned with and fixedly secured to the second arm member and arranged orthogonally relative to the spirit level fixedly secured exteriorly of the junction.

* * * * *